(12) United States Patent
Liberman et al.

(10) Patent No.: US 11,078,092 B2
(45) Date of Patent: Aug. 3, 2021

(54) WATER TREATMENT PLANT

(71) Applicant: I.D.E. TECHNOLOGIES LTD., Kadima (IL)

(72) Inventors: Boris Liberman, Even Yehuda (IL); Herman Weiss, Tel Aviv (IL); Tomer Efrat, Givatayim (IL)

(73) Assignee: I.D.E. TECHNOLOGIES LTD.

( * ) Notice: Subject to any disclaimer, the term of this patent is extended or adjusted under 35 U.S.C. 154(b) by 38 days.

(21) Appl. No.: 15/028,060

(22) PCT Filed: Oct. 7, 2014

(86) PCT No.: PCT/IB2014/065115
§ 371 (c)(1),
(2) Date: Apr. 8, 2016

(87) PCT Pub. No.: WO2015/052648
PCT Pub. Date: Apr. 16, 2015

(65) Prior Publication Data
US 2016/0236947 A1      Aug. 18, 2016

(30) Foreign Application Priority Data

Oct. 10, 2013   (GB) ...................................... 1317975

(51) Int. Cl.
*C02F 1/16*       (2006.01)
*B01D 53/62*      (2006.01)
(Continued)

(52) U.S. Cl.
CPC ................ *C02F 1/16* (2013.01); *B01D 3/065* (2013.01); *B01D 61/06* (2013.01); *C02F 1/441* (2013.01);
(Continued)

(58) Field of Classification Search
CPC .... B01D 3/065; B01D 61/06; B01D 53/1475; B01D 53/62; C02F 1/16; C02F 1/441;
(Continued)

(56) References Cited

U.S. PATENT DOCUMENTS 3,632,505 A *  1/1972  Nelson ................. B01D 61/025
                                                210/652
3,817,653 A *  6/1974  Onal ..................... F04D 29/426
                                                415/74

(Continued)

FOREIGN PATENT DOCUMENTS

EP      1701006       9/2006
EP      1908733       4/2008
(Continued)

OTHER PUBLICATIONS

JPWO2012008015A1_ENG (Patentscope machine translation of Kageyama) (Year: 2012).*

(Continued)

*Primary Examiner* — Jonathan Miller
*Assistant Examiner* — Gabriel E Gitman
(74) *Attorney, Agent, or Firm* — Fresh IP PLC; Clifford D. Hyra; Aubrey Y. Chen (57) ABSTRACT

A pumping apparatus for a water treatment plant, the pumping apparatus comprising a gas supply, at least one gas turbine 11 connected to the gas supply, the at least one gas turbine connected to drive at least one primary pump 12 through a reduction gear train 13 and clutch 14, a waste heat boiler 26 having a feed water input, the waste heat boiler having an exhaust gas input 26a to receive exhaust gas from the at least one gas turbine 11 and generate steam from the feed water, the waste heat boiler having an steam output 18, the apparatus further comprising at least one steam turbine 20, the at least one steam turbine connected to drive at least (Continued)

one secondary pump 21, the at least one steam turbine being connected to the steam output 18 of the waste heat boiler, the at least one steam turbine 20 further having an exhaust steam output 27, the apparatus further comprising a condensing apparatus 28 to receive steam from the exhaust steam output and generate a feed water stream at a feed water output, the feed water outlet being connected to the feed water input of the waste heat boiler 26.

22 Claims, 4 Drawing Sheets (51) Int. Cl.
F01K 17/04 (2006.01)
F01K 23/10 (2006.01)
F01K 15/00 (2006.01)
F01K 9/00 (2006.01)
B01D 3/06 (2006.01)
B01D 61/06 (2006.01)
C02F 1/44 (2006.01)
F01K 11/02 (2006.01)
C02F 101/10 (2006.01)
C02F 103/08 (2006.01)

(52) U.S. Cl.
CPC .............. F01K 9/003 (2013.01); F01K 11/02 (2013.01); F01K 15/00 (2013.01); F01K 17/04 (2013.01); F01K 23/10 (2013.01); C02F 2101/10 (2013.01); C02F 2103/08 (2013.01)

(58) Field of Classification Search
CPC .. C02F 2101/10; C02F 2103/08; F01K 9/003; F01K 11/02; F01K 15/00; F01K 17/04; F01K 23/10; Y02C 20/40; E21B 41/0064; E21B 43/164
See application file for complete search history.

(56) References Cited

U.S. PATENT DOCUMENTS

| | | | | |
|---|---|---|---|---|
| 4,083,781 A | * | 4/1978 | Conger | C02F 1/04 210/651 |
| 4,178,761 A | * | 12/1979 | Schwartzman | F01K 25/10 60/648 |
| 4,581,829 A | * | 4/1986 | Becker | F26B 11/16 34/402 |
| 4,772,385 A | * | 9/1988 | Yamada | B01D 61/12 210/87 |
| 5,560,210 A | | 10/1996 | Bronicki | |
| 5,887,418 A | * | 3/1999 | Bruckner | F01K 23/106 60/783 |
| 6,086,722 A | * | 7/2000 | Webster, Jr. | C01B 3/52 159/44 |
| 7,073,337 B2 | * | 7/2006 | Mangin | B01D 3/007 60/783 |
| 7,754,169 B2 | * | 7/2010 | Constantz | B01D 53/1475 423/165 |
| 8,088,257 B2 | * | 1/2012 | Kemp | C02F 1/14 202/234 |
| 8,328,996 B2 | * | 12/2012 | St. Germain | C02F 1/16 203/10 |
| 2002/0006969 A1 | * | 1/2002 | O'Beck | C10G 2/32 518/704 |
| 2007/0125719 A1 | | 6/2007 | Yarbrough et al. | |
| 2007/0163932 A1 | * | 7/2007 | Gianfranco | B01D 61/12 210/137 |
| 2009/0152209 A1 | * | 6/2009 | Agrawal | C10L 5/46 210/758 |
| 2010/0326924 A1 | * | 12/2010 | Georgiou | E21B 41/0064 405/129.1 |
| 2011/0035154 A1 | * | 2/2011 | Kendall | C04B 7/364 702/14 |
| 2011/0084011 A1 | * | 4/2011 | Miller | C02F 1/325 210/198.1 |
| 2011/0108405 A1 | * | 5/2011 | Bommareddy | C02F 9/00 202/203 |
| 2011/0108484 A1 | * | 5/2011 | Liberman | C02F 1/441 210/652 |
| 2011/0147195 A1 | * | 6/2011 | Shapiro | C02F 1/16 203/10 |
| 2011/0209407 A1 | * | 9/2011 | Arya | B01D 19/0036 48/62 R |
| 2012/0037566 A1 | * | 2/2012 | Achilli | B01D 61/002 210/652 |
| 2012/0067046 A1 | * | 3/2012 | Drenik | B01D 1/0058 60/645 |
| 2013/0227957 A1 | * | 9/2013 | Droux | F01K 23/103 60/775 |
| 2013/0255258 A1 | | 10/2013 | Loveday | |

FOREIGN PATENT DOCUMENTS

| | | | | |
|---|---|---|---|---|
| GB | 1091616 | | 11/1967 | |
| GB | 2041098 | * | 9/1980 | ............ F01K 17/00 |
| JP | WO2012008015 A1 | * | 1/2012 | ............ C02F 1/16 |
| WO | 2010052713 | | 5/2010 | |
| WO | 2012052277 | | 4/2012 | |
| WO | WO2012/052277 A1 | * | 4/2012 | ............ F01K 17/04 |
| WO | WO2012052277 A1 | * | 4/2012 | ............ F01K 17/04 |

OTHER PUBLICATIONS

Aradottir et al. (2011, CarbFix: a CCS pilot project imitating and accelerating natural CO2 sequestration, Greenhouse Gases: Science and Technology, 1(2), 105-118) (Year: 2011).*
Kaszuba et al. (2009, Geochemical impacts of sequestering carbon dioxide in brine formations, Carbon sequestration and its role in the global carbon cycle, 183, 239-248) (Year: 2009).*
Combined Search and Examination report issued in GB1317975.9 dated Dec. 3, 2013.
Combined Search and Examination report issued in GB1307063.6 dated Jun. 6, 2013.
ISR and WO issued in PCT/IB2014/065115 dated Apr. 9, 2015.

* cited by examiner

WATER TREATMENT PLANT

This application claims the benefit of Great Britain patent Application No. 1317975.9, filed Oct. 10, 2013, which is hereby incorporated by reference in its entirety.

TECHNICAL FIELD

The present invention relates to a pumping apparatus for a water treatment system, particularly but not exclusively for a desalination plant, a water treatment system, a method of operating a pumping apparatus, a method of operating a desalination plant and a method of discharging a waste gas stream.

BACKGROUND OF THE INVENTION

Water treatment plants, and in particular reverse osmosis ('RO') desalination plants, require a large number of high pressure pumps to drive the water through the plant. Conventionally these pumps are electrically powered, but relying on an electrical supply can be disadvantageous. The process of electrical generation, burning fuel to generate steam and drive generators, and transmission introduces inefficiencies into the process. Additionally, in an environment in which electricity is temporarily or chronically a scarce resource, for example by virtue of remoteness, vulnerability to natural events or disasters, or otherwise due do an unreliable supply, and where gas is available, gas turbines are known to be effective for the operation of low-pressure pumps. It is known in such circumstances to use a gas turbine to drive a generator to provide electricity to run pumps. It is desirable to maximise the efficiency of such process.

SUMMARY OF THE INVENTION

According a first aspect of the invention there is provided a pumping apparatus for a water treatment plant, the pumping apparatus comprising a fuel supply, at least one engine or turbine connected to the fuel supply, the at least one engine or turbine connected to drive at least one primary pump through a gear train and clutch, the engine or turbine having a steam source having a feed water input, an exhaust steam stream from the engine or turbine, the apparatus further comprising a distillation apparatus having an exhaust steam connection to receive the exhaust steam stream from the engine or turbine and an untreated water input to receive an untreated water stream to be treated, the distillation apparatus being operable to generate a feed water stream at a feed water output, the feed water output being connected to the feed water input of the steam source.

The fuel supply may comprise a gas supply, the at least one engine or turbine may comprise at least one gas turbine, the at least one gas turbine being connected to the gas supply, the at least one gas turbine connected to drive the at least one primary pump through a gear train and clutch, the steam source to the gas turbine comprising a waste heat boiler having a feed water input, the waste heat boiler having an exhaust gas input to receive exhaust gas from the at least one gas turbine and generate steam from the feed water, the waste heat boiler having an steam output, the apparatus further comprising at least one steam turbine, the at least one steam turbine connected to drive at least one secondary pump, the at least one steam turbine being connected to the steam output of the waste heat boiler, the at least one steam turbine further having an exhaust steam output, the feed water outlet being connected to the feed water input of the waste heat boiler.

The fuel supply may comprise a supply of syngas from a coal gasification plant, the at least one engine or turbine comprising at least one gas engine, to receive syngas from the fuel supply, the at least one gas engine having a cooling system to receive cooling system feed water and generate a first waste hot water or steam stream, the apparatus further comprising a gas cooling apparatus to cool the supply of syngas, the gas cooling apparatus receiving a gas cooling feed water stream and generating a second waste hot water or steam stream, the distillation apparatus being operable to receive the first waste hot water or steam stream and second waste water or steam stream and generate the feed water stream, the feed water stream being supplied to at least one of the gas cooling apparatus and the at least one gas engine.

The fuel supply may comprise coal and the steam source may comprise a coal-fired boiler, the at least one engine or turbine comprising at least one steam turbine, the waste steam stream comprising steam from the at least one steam turbine.

The distillation apparatus may be a multi-effect distillation apparatus.

The distillation apparatus may be operable to condense the exhaust steam stream to generate at least part of the feed water stream.

The distillation apparatus may be operable to treat at least part of the untreated water stream to generate at least part of the feed water stream.

The distillation apparatus may have an untreated water input to receive water to be treated, and an untreated water output.

The distillation apparatus may be arranged such that the untreated water is heated by the exhaust steam.

The waste heat boiler may have an exhaust gas outlet, the exhaust gas outlet being connected to a post-treatment unit, wherein at least a proportion of carbon dioxide in the exhaust gas may be dissolved in water.

The post-treatment apparatus may have a waste water inlet to receive waste water from the water treatment plant.

The untreated water may comprise sea water and the waste water may comprise brine.

The post-treatment apparatus may have a discharge outlet to discharge waste water and dissolved carbon dioxide.

The at least one gas turbine may drive two or more primary pumps.

The at least one steam turbine may be connected to a secondary pump by at least one of a gear train and a clutch.

The primary pump may be more powerful than the secondary pump.

The apparatus may comprise a plurality of gas turbines.

The apparatus may comprise a plurality of steam turbines.

According to a second aspect of the invention is provided a water treatment plant comprising at least one water treatment unit and a pump apparatus according to the first aspect of the invention.

The water treatment plant may comprise a reverse osmosis plant.

According to a third aspect of the invention there is provided a method of operating a pumping apparatus for a water treatment plant, comprising the steps of supplying fuel to at least one engine or turbine such that the at least one engine or turbine drives at least one primary pump through a gear train and clutch, receiving an exhaust steam stream from the engine or turbine and an untreated water stream at a distillation apparatus, the distillation apparatus being operable to generate a feed water stream at a feed water output, supplying feed water to a steam source to generate steam.

The method may comprise supplying untreated water to the distillation apparatus and subsequently supplying the warmed untreated water to the water treatment plant.

The method may comprise the steps of receiving exhaust gas from a waste heat boiler, the exhaust gas including carbon dioxide, and dissolving at least a portion of the carbon dioxide of the exhaust gas in a waste water stream.

The method may comprise the step of supplying waste water from the water treatment plant to provide the waste water stream.

The untreated water may comprise sea water and the waste water may comprise brine.

According to a fourth aspect of the invention there is provided a method of discharging an exhaust gas containing carbon dioxide comprising the steps of operating a water treatment apparatus and receiving a waste stream from the water treatment apparatus, combining the waste water stream and the exhaust gas stream such that at least a proportion of the carbon dioxide is dissolved in the waste gas stream, and discharging the waste water stream.

The waste water stream may comprise brine and the combined waste stream may be discharged at sea.

BRIEF DESCRIPTION OF THE DRAWINGS

Embodiments of the invention will now be described by way of example only with reference to the accompanying drawings wherein.

DETAILED DESCRIPTION

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before explaining at least one embodiment of the invention in detail, it is to be understood that the invention is not limited in its application to the details of construction and the arrangement of the components set forth in the following description or illustrated n the drawings. The invention is applicable to other embodiments or of being practiced or carried out in various ways. Also, it is to be understood that the phraseology and terminology employed herein is for the purpose of description and should not be regarded as limiting.

Figure 1:
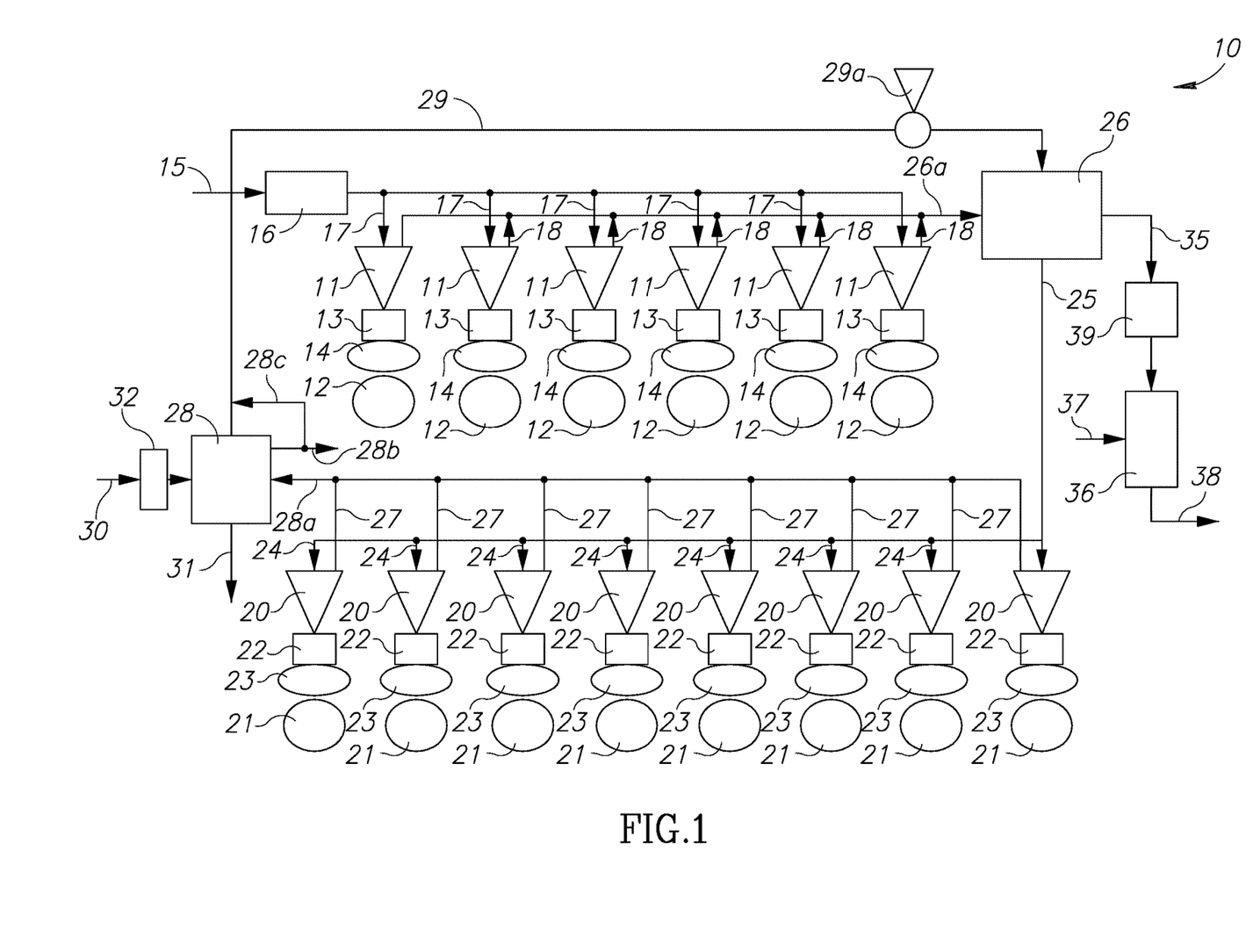
FIG. 1 is a schematic diagram illustrating a pumping apparatus.

Referring now to FIG. 1, a pumping apparatus embodying the present invention is generally shown at 10. The apparatus comprises a plurality of gas turbines 11, in the present example six gas turbines. Each gas turbine drives a corresponding primary pump 12 through a reduction gear train 13 and a clutch 14. A gas feed is shown at 15 providing liquid gas, for example liquefied natural gas, liquefied syngas, liquefied petroleum gas or other suitable fuel, which is supplied to the gas turbines 11. The liquid gas is passed through a gas cleaning and temperature control unit 16 which may either heat or cool the supplied liquid gas to a desired temperature. Each of the gas turbines 11 has a gas input 17 which is connected to the gas temperature controller 16. Each gas turbine further has an exhaust gas outlet generally shown at 18.

The pumping apparatus further comprises a plurality of steam turbines generally shown at 20. Each steam turbine 20 drives at least one secondary pump 21 through a gear train 22 and a clutch 23. Each steam turbine has a steam input 24 which is connected to a steam outlet 25 of a waste heat boiler 26.

The gear apparatus 13 is necessary as the gas turbines 11 rotate at high speed to efficiently drive the primary pumps 12. Providing a number of smaller turbines with reduction gearing allows for efficient use of the energy supplied in the form of liquid gas and allows relatively more powerful pumps 12 to be used. Similar considerations apply to the secondary pumps 21. Although six gas turbines and eight steam turbines are shown, it will be apparent that the plant may use one or any desired number of gas turbines and steam turbines.

Waste heat boiler 26 has an exhaust gas input 26a which is connected to the exhaust gas output 18, and comprises a suitable heat exchange system such that heat from the exhaust gases from the gas turbines 11 is used to generate steam from feed water. The generated steam is passed to the steam turbines 20.

An exhaust steam stream from each steam turbine is supplied through an exhaust steam outlet 27 to a steam connection 28a of a distillation apparatus 28. In the present example, the distillation apparatus 28 preferably comprises a multi-effect distillation apparatus (MED), although any other distillation apparatus may be used as desired. The distillation apparatus 28 further receives water to be treated from an untreated water supply 30. By untreated water is meant water intended to be subsequently supplied to a water treatment plant, for example a desalination plant.

The distillation apparatus 28 in the present example performs a distillation process in known manner using the heat from the exhaust steam. The exhaust steam from the steam turbines is condensed, to provide a condensate feed water stream. The feed water stream from the distillation apparatus 28 is passed through feed water connection 29 to a feed water input of the waste heat boiler 26. Pump 29a pumps water through the feed water connection 29.

Additionally, heat from the exhaust steam is used to at least partially treat the untreated water stream, to provide a treated distillate water stream illustrated at 28b. Some or all of the treated water stream is supplied to the feed water connection 29 as illustrated at 28c, to compensate for losses in the steam cycle of the apparatus. In the alternative, the distillation apparatus may have a single feed water output which receives water from both condensed steam and treated water, and some or all of the single feed may be passed to the waste heat boiler.

The distillation apparatus further has an output water supply 31. Where the pumping apparatus is provided as part of a water treatment or desalination plant, the output water supply passes untreated water to a suitable water treatment or desalination apparatus, such as a plurality of further distillation systems. The untreated water will be warmed by the distillation apparatus 28.

Optionally, a heating unit 32 may be provided before the distillation unit 38 to heat the untreated water stream 30. Treatment steps may be performed on the water stream before supplying the water stream to the pumping apparatus 10.

The waste heat boiler 26 has a cooled exhaust gas output generally shown at 35 which supplies cool exhaust gas to a post-treatment apparatus 36. The post-treatment apparatus 36 receives waste water through a waste water input 37, The exhaust gases from the gas turbines contain a substantial amount of carbon dioxide, and the post-treatment apparatus is operable to dissolve at least a proportion of the carbon dioxide from the exhaust gas in the waste water stream 37. A discharge outlet 38 allows the combined waste water and carbon dioxide stream to be safely or appropriately disposed of. Depending on the pressure and temperature of the waste water stream 37, the exhaust gas pressure and temperature may be controlled to maximise the proportion of dissolved carbon dioxide and this is carried out at gas control unit 39.

In the present example, each of the primary pumps 12 are relatively high powered pumps, while the secondary pumps 21 are relatively low powered pumps. Accordingly, in one example 270 MW of energy are supplied as liquid gas at 15, and each of the primary pumps 12 is a 15 MW pump. Approximately 180 MW of power in the form of hot gases at about 400° C. are supplied to the waste heat boiler 26. In this example, 160 MW of steam is generated by the waste heat boiler 26 and supplied to the steam turbines 20. The secondary pumps 21 in this example use about 35 MW in total, and relatively cool exhaust steam with about 125 MW is supplied to the distillation apparatus 28. The exhaust steam is condensed in the heat exchange distillation apparatus 28 and the energy transferred to the untreated water stream 30.

Figure 2:
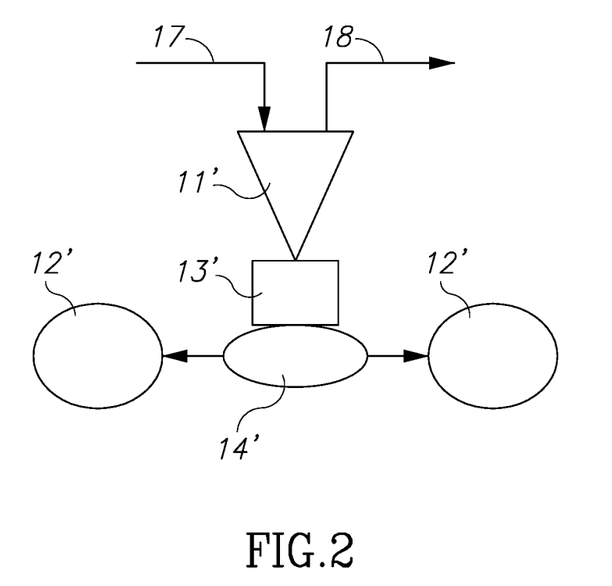
FIG. 2 is a diagrammatic illustration of an alternative gas turbine and pump for use in the apparatus of FIG. 1, FIG. 3. Is a schematic diagram illustrating a further pumping apparatus.

In an alternative configuration shown in FIG. 2, a more powerful steam turbine is shown at 11' driving a pair of primary pumps 12' through suitable gearing 13' and clutch mechanism 14'. In this example, the gas turbine is a 30 MW turbine driving a pair of 15 MW pumps. The six turbines 11 of FIG. 1 could be replaced with three turbines 11', for example.

In one envisaged application of this invention, the apparatus 10 is used of as part of a water treatment apparatus, and in particular a desalination plant, and more particularly a reverse osmosis desalination plant. The at least one gas turbine 11 is used to pressurize the reverse osmosis system, while the secondary pumps 21 may for example comprise intake pumps, circulation pumps, booster pumps and other relatively low powered pumps as required. The untreated water stream in this example is sea water at an example rate 25 m$^3$/s, and the effect of the distillation apparatus 28 is to warm the supply of sea water passed to the reverse osmosis system. The heating element 32 may be any suitable heat exchanger, for example a heat exchanger with brine received from the reverse osmosis plant. As an alternative, the feed water supplied to the waste heat boiler may be wholly or partly distillate from the water treatment apparatus. The distillation apparatus may comprise any part of the water treatment apparatus, and need not simply be limited to condensing the exhaust steam and heating the untreated water stream.

It will be apparent that any other suitable water treatment or desalination plant may be used in conjunction with this invention. In any case, the waste water stream from the water treatment plant will be relatively concentrated brine suitable for receiving a relatively high concentration of carbon dioxide.

In an alternative, it will be apparent that the carbon dioxide dissolved in the waste brine stream need not necessarily come from the gas turbines or an apparatus 10 as shown herein, but from any other plant, such as a nearby power station or other source of exhaust gas. Advantageously, the waste water stream with dissolved carbon dioxide may be discharged into the sea where the dissolved carbon dioxide is consumed in photosynthesis and converted into oxygen. In the present example, waste brine is at a pressure of about 70 bar at 250° C., and approximately 1300 g/m$^3$ of carbon dioxide can be dissolved in the brine after matching the carbon dioxide pressure and temperature to that of the brine.

Figure 3:
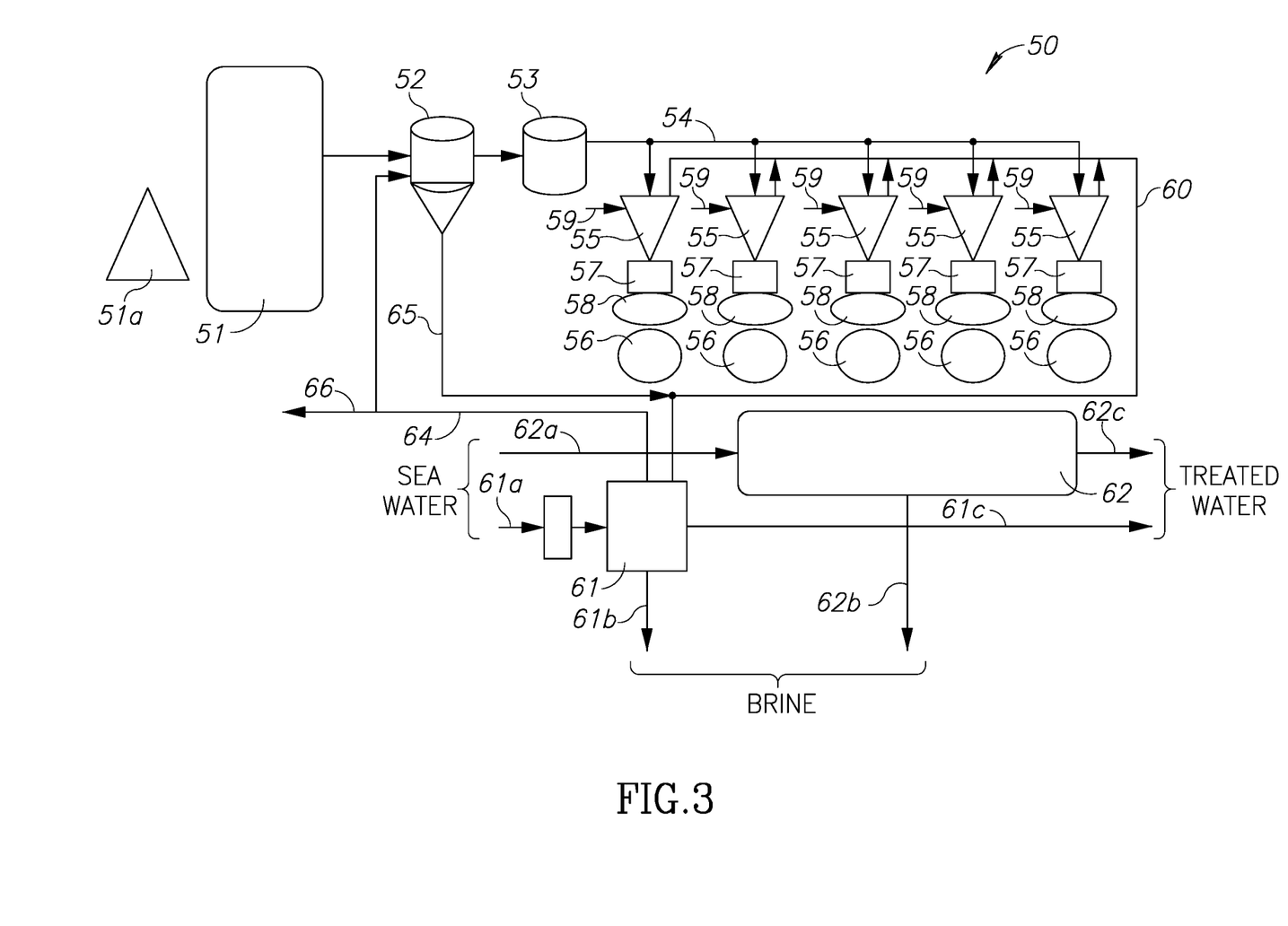

An alternative embodiment of a pumping apparatus is generally shown in FIG. 3 at 50, in which the gas supply of FIG. 1 is replaced with a supply of syngas generated by the gasification of coal. A coal gasification plant is generally shown at 51, to generate syngas from a supply of coal generally shown at 51a. The syngas is supplied to a gas cleaning and cooling apparatus 52 and then to a holding tank 53. The syngas is then supplied through connection 54 to gas engines 55, each of which drives a corresponding high-power pump 56 through gearing 57 and clutch 58.

The gas engines 55 are of known type, in which gas is burnt in an internal combustion engine to provide output drive. Gas engines generally are provided with cooling systems to remove waste heat from the engines. A cooling water supply is illustrated at 59. Advantageously, the cooling system acts as a steam source. The resulting hot water or steam can be used in the process to provide a first waste water or steam stream, in this case carried via connection 60 to a distillation apparatus 61, in this example comprising a multi-effect distiller (MED). The pumps 56 are used to drive water through a reverse-osmosis plant, here generally illustrated at 62

As shown by connections 61a, 62a, the distillation apparatus 61 and reverse osmosis plant 62 receive a supply of untreated water, for example sea water. Brine is disposed of at outputs 61b, 62b, and distillate/treated water is passed to output water supply 61c, 62c. Condensate from the distillation apparatus passes to cooling water stream 64, which is supplied to the gas cleaning and cooling apparatus 52. As shown by connection 65, a second waste hot water or steam stream is returned from the gas cleaning and cooling apparatus 52 to the distillation apparatus 61, combined with the steam from the gas engines 55 via connection 60. As illustrated by arrow 66, some of the condensate may be supplied to cooling water supply 59. In a similar manner to the system of FIG. 1, some of the distillate stream may be passed to the cooling water stream to compensate for losses in the cooling water cycles. The brine may be passed to an apparatus to dissolve exhaust gases from the gas engines for disposal as shown in FIG. 1, and a waste heat boiler may be used to recover heat energy from the gas engines' exhaust. The apparatus of FIG. 3 may also be adapted to include a plurality of steam turbines driven by the gas engines' steam output, in similar manner to turbines 21 of FIG. 1. Waste heat from the distillation apparatus 61 may be used to warm the untreated water stream 62a for supply to the reverse osmosis plant 62.

The coal gasification plant 51 may be provided as part of a water treatment facility, or may be a separate facility and the syngas is supplied to the water treatment plant by any appropriate method.

Figure 4:
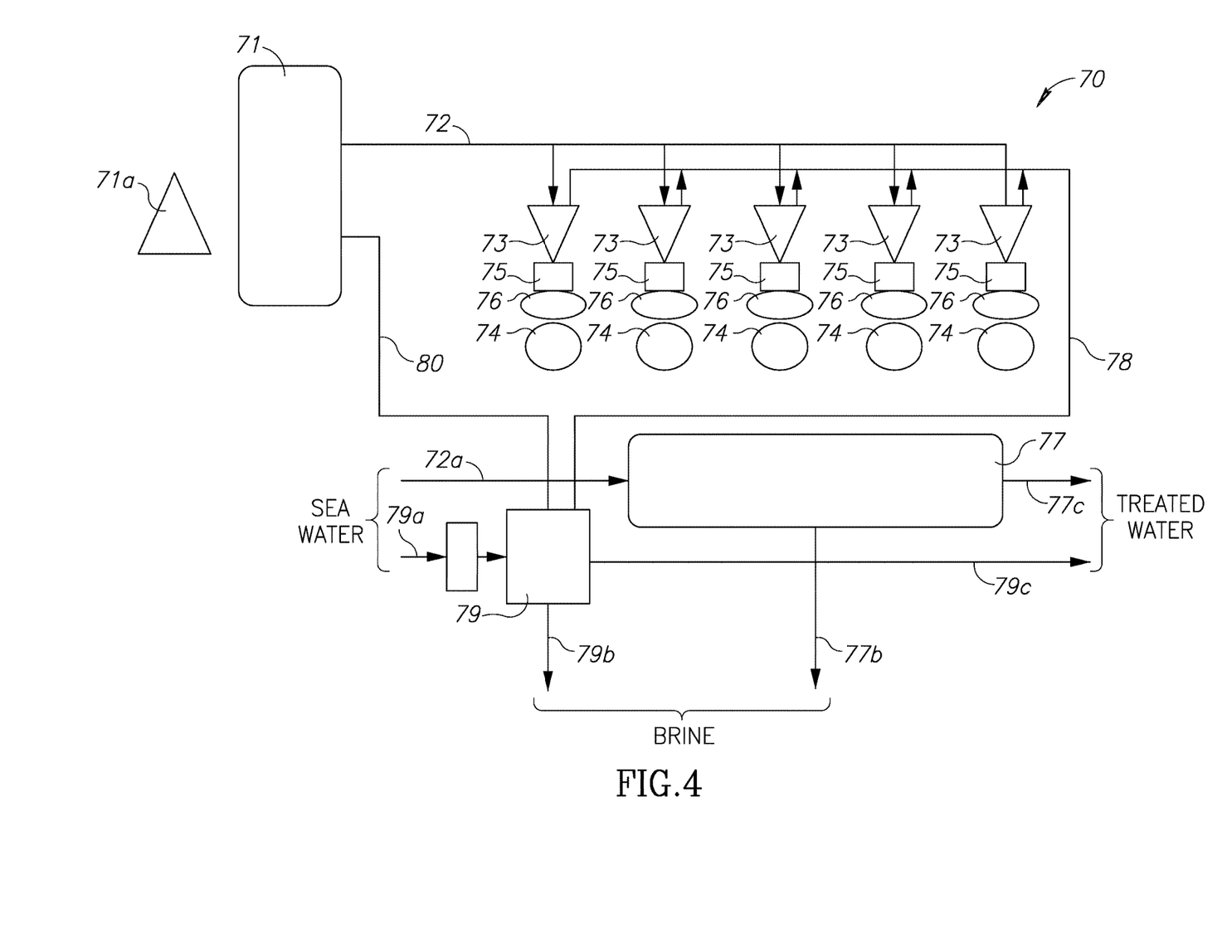
FIG. 4 is a schematic diagram illustrating another pumping apparatus.

A further alternative system is shown at 70 in FIG. 4. A steam source comprising a coal-fired boiler is shown at 71, with a coal supply illustrated at 71a. Steam is supplied by connection 72 to a plurality of steam turbines 73, each of which drives a corresponding pump 74 through gear train 75 and clutch 76. The pumps 74 drive feed water through a reverse osmosis plant generally shown at 77. A waste steam stream from the steam turbines 73 is carried by connection 78 to distillation apparatus 79.

In similar manner to FIG. 3, untreated water is supplied to reverse osmosis pant 77 and distillation apparatus 79 by untreated water streams 77a, 79a. Brine is disposed of at outputs 77b, 79b, and distillate/treated water is passed to output water supply 77c, 79c. Condensate from distillation apparatus 79 is supplied to the boiler 71 as shown by feed water stream 80. In a similar manner to the system of FIG. 1, some of the distillate stream may be passed to the cooling water stream to compensate for losses in the cooling water cycles. The brine may be passed to an apparatus to dissolve exhaust gases from the coal-fired boiler for disposal as shown in FIG. 1. The apparatus of FIG. 4 may also be adapted to include a plurality of secondary steam turbines driven by the turbines' waste steam output. Waste heat from the distillation apparatus 61 may be used to warm the untreated water stream 77a for supply to the reverse osmosis plant 77. The coal-fired boiler 71 may be part of the water treatment facility, but may alternatively be located elsewhere and the steam piped to the water treatment facility. The steam itself may even be a by-product, for example of a coal-fired electricity generation facility.

In each case, by removing the electricity generation and transmission steps, efficiency improvements of around 10% can be made. In addition, operating a RO plant in this manner enables the use of a small number of relatively large steam turbines with high efficiency.

In the above description, an embodiment is an example or implementation of the invention. The various appearances of "one embodiment", "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Furthermore, it is to be understood that the invention can be carried out or practiced in various ways and that the invention can be implemented in embodiments other than the ones outlined in the description above.

Meanings of technical and scientific terms used herein are to be commonly understood as by one of ordinary skill in the art to which the invention belong, unless otherwise defined.

The invention claimed is:

1. A water treatment plant comprising:
   at least one water treatment unit and at least one distillation apparatus, each having an untreated feed water inlet, a treated feed water outlet, and a brine outlet, the at least one water treatment unit comprising at least one pumping apparatus comprising:
      a non-electrical fuel supply comprising a liquid gas supply;
      at least one engine or turbine connected to the non-electrical fuel supply, the at least one engine or turbine connected to drive at least one primary pump through a gear train and clutch, the at least one engine or turbine comprising a steam source, the steam source comprising a feed water input; and
      an exhaust steam stream generated from the steam source of the at least one engine or turbine, the exhaust steam stream being connected to the at least one distillation apparatus,
   wherein the at least one pumping apparatus pressurizes the at least one water treatment unit,
   wherein the at least one distillation apparatus is operable to:
      receive, at the untreated feed water inlet, an untreated water stream comprising untreated feed water supplied from an untreated water supply,
      use heat from the exhaust steam stream to at least partially treat the untreated water stream, thereby generating a treated water stream separate from the untreated water stream,
      treat the exhaust steam stream, thereby generating a condensate water stream,
      combine, at a feed water output, at least part of the treated water stream and at least part of the condensate water stream, thereby generating a feed water stream, and
      pass at least part of the feed water stream to a waste heat boiler associated with the at least one engine or turbine, wherein the waste heat boiler is the steam source, and
   wherein the water treatment plant further comprises a gas cleaning and temperature control unit to heat or cool liquid gas from the liquid gas supply to a predetermined temperature, and to clean the liquid gas,
   wherein the non-electrical fuel supply comprises the liquid gas supply,
   the at least one engine or turbine comprises at least one gas turbine, the at least one gas turbine being connected to the liquid gas supply,
   the at least one gas turbine is connected to drive the at least one primary pump through the gear train and clutch,
   the steam source of the at least one gas turbine comprises the waste heat boiler having the feed water input,
   the waste heat boiler has an exhaust gas input to receive exhaust gas from the at least one gas turbine and generate steam from the feed water,
   the waste heat boiler has a steam output, and
   wherein the at least one pumping apparatus further comprises at least one steam turbine, the at least one steam turbine being connected to drive at least one secondary pump,
   the at least one steam turbine is connected to the steam output of the waste heat boiler,
   the at least one steam turbine further has an exhaust steam output, and
   the treated feed water outlet of the at least one distillation apparatus is connected to the feed water input of the waste heat boiler,
   wherein the waste heat boiler has an exhaust gas outlet, the exhaust gas outlet being connected to a post-treatment unit, the post-treatment unit comprises a waste water inlet to receive waste water from the water treatment plant, the waste water comprises concentrated brine suitable for dissolving carbon dioxide, and the post-treatment unit being operable to dissolve at least a portion of carbon dioxide from the exhaust gas in the waste water, thereby generating the dissolved carbon dioxide, and wherein a pressure and a temperature of the at least a portion of carbon dioxide from the exhaust gas is matched to a pressure and a temperature of the concentrated brine.

2. The water treatment plant according to claim 1, wherein the at least one distillation apparatus comprises a multi-effect distillation apparatus.

3. The water treatment plant according to claim 1, wherein the at least one distillation apparatus is operable to condense the exhaust steam stream to generate at least part of the feed water stream.

4. The water treatment plant according to claim 1, wherein the at least one distillation apparatus has a brine output which discharges brine.

5. The water treatment plant according to claim 4, wherein the at least one distillation apparatus is arranged such that the untreated water stream is heated by the exhaust steam stream.

6. The water treatment plant according to claim 1, wherein the untreated water stream comprises sea water.

7. The water treatment plant according to claim 1, wherein the post-treatment unit has a discharge outlet to discharge the waste water.

8. The water treatment plant according to claim 1, wherein the at least one engine or turbine drives two or more primary pumps.

9. The water treatment plant according to claim 1, wherein the at least one steam turbine is connected to the at least one secondary pump by at least one of a second gear train and a second clutch.

10. The water treatment plant according to claim 9, wherein the at least one primary pump is more powerful than the at least one secondary pump.

11. The water treatment plant according to claim 1, further comprising a plurality of steam turbines.

12. The water treatment plant of claim 1, wherein the pressure of the concentrated brine is 70 bar and the temperature of the concentrated brine is 250 degrees Celsius.

13. The water treatment plant of claim 12, wherein the waste water comprising the dissolved carbon dioxide is discharged into a sea.

14. A water treatment plant comprising:
at least one water treatment unit and at least one distillation apparatus, each having an untreated feed water inlet, a treated feed water outlet, and a brine outlet, the at least one water treatment unit comprising at least one pumping apparatus comprising:
a supply of syngas generated from gasification of coal,
a plurality of gas engines each connected to the supply of syngas, each of the plurality of gas engines configured to drive a pump through a gear train and a clutch,
wherein each of the plurality of gas engines comprises a cooling system to receive cooling water from a cooling water supply and to generate a first waste stream, wherein the cooling system acts as a steam source,
wherein the at least one pumping apparatus further comprises a gas cooling apparatus to cool the supply of syngas, the gas cooling apparatus receiving a gas cooling feed water stream and generating a second waste stream, the gas cooling apparatus comprising at least one heat exchanger,
wherein the at least one distillation apparatus is operable to receive the first waste stream and the second waste stream, and to combine the first waste stream and the second waste stream, thereby generating a condensate stream,
wherein the condensate stream is supplied to at least one of the gas cooling apparatus and the plurality of gas engines,
wherein brine is passed from the brine outlet to a further apparatus to dissolve exhaust gas from the plurality of gas engines,
wherein each of the plurality of gas engines has an exhaust gas outlet, the exhaust gas outlet being connected to a post-treatment unit,
wherein at least a proportion of carbon dioxide in the exhaust gas is dissolved in water, and
wherein a pressure and a temperature of at least a portion of carbon dioxide from the exhaust gas is matched to a pressure and a temperature of the brine.

15. The water treatment plant of claim 14, further comprising a waste heat boiler to recover heat energy from the exhaust gases.

16. The water treatment plant of claim 15, further comprising a plurality of steam turbines driven by the plurality of gas engines.

17. The water treatment plant of claim 16, wherein waste heat from the at least one distillation apparatus is used to warm an untreated water stream supplied to the at least one water treatment unit.

18. A water treatment plant comprising:
at least one water treatment unit and at least one distillation apparatus, each having an untreated feed water inlet, a treated feed water outlet, and a brine outlet, the at least one water treatment unit comprising at least one pumping apparatus comprising:
a non-electrical fuel supply;
at least one engine or turbine connected to the non-electrical fuel supply, the at least one engine or turbine connected to drive at least one primary pump through a gear train and clutch, the at least one engine or turbine comprising a steam source, the steam source comprising a feed water input; and
an exhaust steam stream generated from the steam source of the at least one engine or turbine, the exhaust steam stream being connected to the at least one distillation apparatus, the at least one distillation apparatus being operable to:
receive an untreated water stream, and
treat at least a part of the untreated water stream to generate at least a part of a feed water stream to be fed back into the at least one distillation apparatus,
wherein the water treatment plant further comprises a heating unit located before the at least one distillation apparatus, the heating unit configured to heat the untreated water stream before the at least one distillation apparatus receives the untreated water stream,
wherein the water treatment plant further comprises a post-treatment unit that receives exhaust gas from the at least one engine or turbine, wherein the exhaust gas comprises carbon dioxide, and wherein the post-treatment unit is configured to dissolve at least a portion of the carbon dioxide into a waste water stream,
wherein the water treatment plant further comprises a gas control unit configured to control a pressure and a temperature of the exhaust gas in order to maximize the at least a portion of the carbon dioxide that is dissolved into the waste water stream, and
wherein the at least one pumping apparatus pressurizes the at least one water treatment unit.

19. The water treatment plant of claim 18, wherein the non-electrical fuel supply comprises syngas generated by gasification of coal at a coal gasification plant, and further comprising:
- at least one cooling system associated with the at least one engine or turbine, the at least one cooling system operable to act as an additional steam source and to generate a first additional steam stream; and
- a gas cleaning and cooling apparatus operable to receive both the syngas and a cooling water stream, the cooling water stream comprising condensate supplied from the at least one distillation apparatus,
- wherein the gas cleaning and cooling apparatus is further operable to supply a second additional steam stream to the at least one distillation apparatus, and
- wherein the first additional steam stream is combined with the second additional steam stream.

20. The water treatment plant of claim 19, wherein at least a portion of the condensate is supplied to the at least one cooling system.

21. The water treatment plant of claim 18, further comprising a discharge outlet for discharging the waste water stream with the dissolved carbon dioxide into seawater.

22. The water treatment plant of claim 18, wherein the post-treatment unit is further configured to dissolve a second portion of carbon dioxide from an exhaust gas source other than the at least one engine or turbine into the waste water stream.

* * * * *